United States Patent
Surtani

(10) Patent No.: US 8,271,731 B2
(45) Date of Patent: Sep. 18, 2012

(54) NON BLOCKING REHASHING

(75) Inventor: Manik Surtani, London (GB)

(73) Assignee: Red Hat, Inc., Raleigh, NC (US)

( * ) Notice: Subject to any disclaimer, the term of this patent is extended or adjusted under 35 U.S.C. 154(b) by 358 days.

(21) Appl. No.: 12/713,906

(22) Filed: Feb. 26, 2010

(65) Prior Publication Data

US 2011/0213931 A1 Sep. 1, 2011

(51) Int. Cl.
*G06F 12/02* (2006.01)
(52) U.S. Cl. .................. 711/119; 711/170; 711/216
(58) Field of Classification Search .............. 711/119, 711/216, 170, 171, 172
See application file for complete search history.

(56) References Cited

U.S. PATENT DOCUMENTS

| 8,111,707 B2* | 2/2012 | Riddle et al. ............... 370/412 |
| 2006/0112222 A1* | 5/2006 | Barrall ........................ 711/114 |
| 2010/0023726 A1* | 1/2010 | Aviles ......................... 711/216 |
| 2010/0293206 A1* | 11/2010 | Ylonen ....................... 707/813 |

OTHER PUBLICATIONS

Martin, D. and Davis, R., A Scalable Non-Blocking Concurrent Hash Table Implementation with Incremental Rehashing, Dec. 15, 1997, Unpublished manuscript, http://vision/bc.edu~dmartin/papers/nonblocksync.ps, pp. 1-23.
Purcell, C. and Harris, T., Non-Blocking Hashtables with Open Addressing, Technical Report No. 639, University of Cambridge Computer Laboratory, Sep. 2005, pp. 1-23.

* cited by examiner

*Primary Examiner* — John Lane
(74) *Attorney, Agent, or Firm* — Lowenstein Sandler PC

(57) ABSTRACT

An apparatus and a method operating on data at a server node of a data grid system with distributed cache is described. A coordinator receives a request to change a topology of a cache cluster from a first group of cache nodes to a second group of cache nodes. The request includes a cache node joining or leaving the first group. A key for the second group is rehashed without blocking access to the first group while rehashing.

20 Claims, 4 Drawing Sheets

NON BLOCKING REHASHING

TECHNICAL FIELD

Embodiments of the present invention relate to computing systems, and more particularly, to networked memory.

BACKGROUND

Highly concurrent systems often require high throughput of certain data structures. Traditional locks can be used to enforce mutual exclusion and implement operations on concurrent data structures.

Because changes are not propagated quickly enough, rehashing cannot be accomplished without a blocking process of cluster cache nodes. As such, access to a cluster of cache nodes may be blocked when a cache node is leaving or joining the cluster.

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for operating on data at a node of a data grid system with distributed cache. A coordinator receives a request to change a topology of a cache cluster from a first group of cache nodes to a second group of cache nodes. The request includes a cache node joining or leaving the first group. A key for the second group is rehashed without blocking access to the first group while rehashing.

Figure 1:
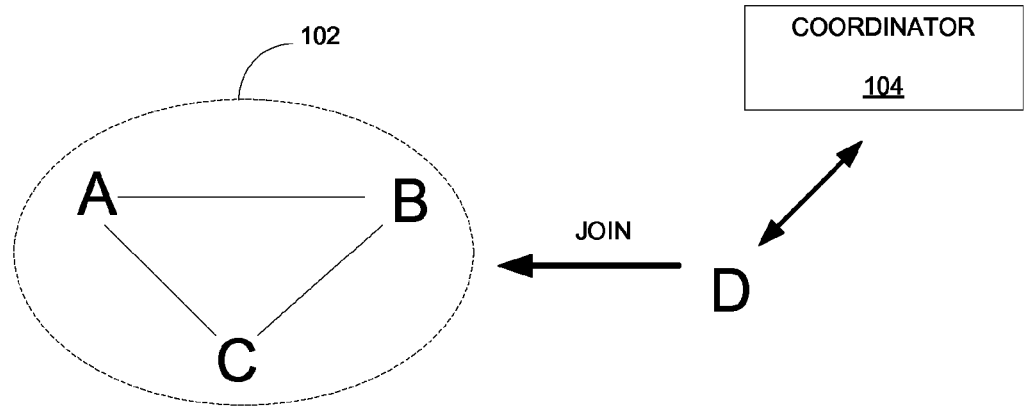
FIG. 1 is a block diagram illustrating one embodiment of a system for non-blocking rehashing of a node joining a cache cluster.

FIG. 1 is a block diagram illustrating one embodiment of a system for non-blocking rehashing of a node joining a cache cluster 102. Cache cluster 102 includes cache nodes A, B, and C. Cache node D requests to join cache cluster 102 by asking permission from coordinator 104. The operations of coordinator 104 are further described below with respect to FIGS. 3 and 4. Rehashing of the keys is performed without blocking access to cache nodes in cache cluster 102.

Figure 2:
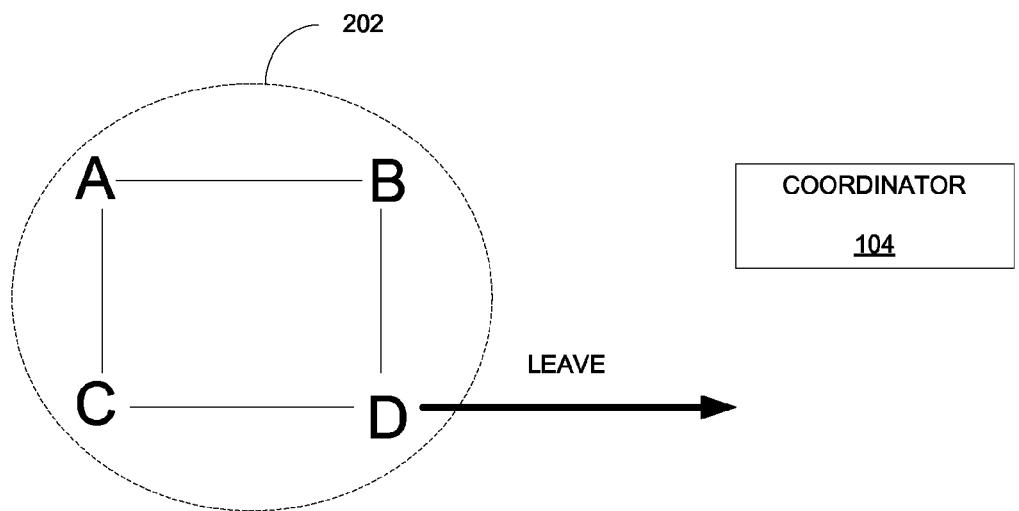
FIG. 2 is a block diagram illustrating one embodiment of a system for non-blocking rehashing of a node leaving a cache cluster.

FIG. 2 is a block diagram illustrating one embodiment of a system for non-blocking rehashing of a node leaving a cache cluster. Cache cluster 202 includes cache nodes A, B, C, and D. Cache node D requests to leave cache cluster 202 by asking permission from coordinator 104. The operations of coordinator 104 are further described below with respect to FIGS. 3 and 4. Rehashing of the keys is performed without blocking access to cache nodes in cache cluster 202.

Figure 3:
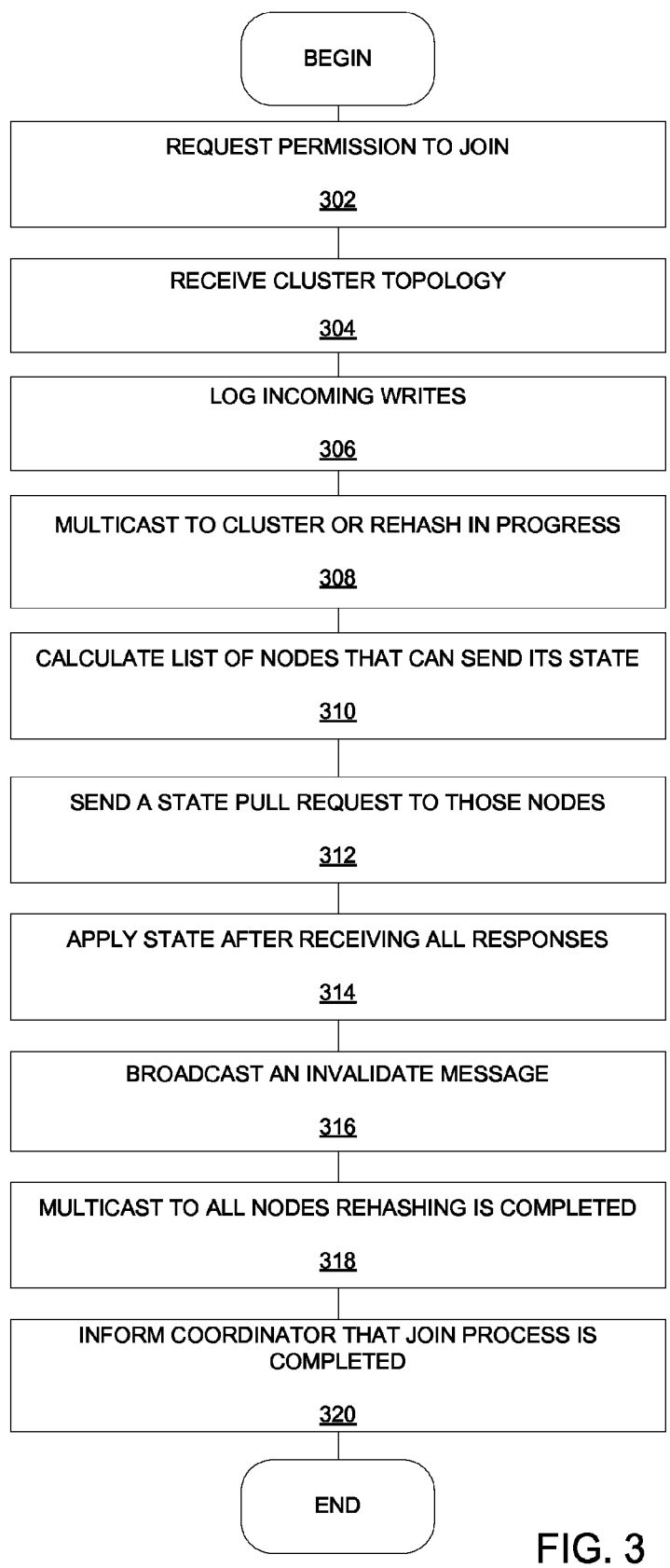
FIG. 3 is a flow diagram illustrating one embodiment of a method for non-blocking rehashing of a node joining a cache cluster.

FIG. 3 is a flow diagram illustrating one embodiment of a method for non-blocking rehashing of a node joining a cache cluster. Only one joiner at a time is allowed. At 302, a joining cache node requests a coordinator for permission to join a cache node cluster. At 304, the coordinator sends the joining cache node, the cluster topology that existed before the joining cache node joined. If permission is not granted, the joining cluster waits and tries again later. At 306, the joining cache node enables transaction logging, to log incoming writes. Remote reads are responded to with an UnsureResponse, prompting the caller to consult the next available data owner. Callers should make sure a definite SuccessfulResponse is used rather than an UnsureResponse.

At 308, the joining cache node multicasts to the cluster to inform of a rehash in progress. All cache nodes update their ConsistentHash (CH) with a UnionCH—which delegates to the old CH and a new one that includes the joining cache node.

At 310, the joining cache node calculates who may send it state, based on the old cluster topology. Given a list of nodes {N1 . . . Nx}, including the joining cache node:
  locate the index of the joiner in this list–iJ
  Nodes that would possibly send state include nodes at positions {iJ–replCount+1 . . . iJ–1, iJ+1}

At 312, joining cache node sends a state PULL request (RPC) to these nodes. Nodes that receive the PULL request loop through all keys in their data containers (and non-shared cache stores), identifying keys that should be sent to the joining cache node—by consulting the CH. Entries are added to a response map. This happens in parallel. There is no need to wait for all responses.

At 314, once all responses are received, joining cache node applies this state.

At 316, joining cache node broadcasts an invalidate message to all nodes that the keys may have mapped to (again using the CH) to ensure unnecessary copies are not maintained. At 318, joining cache node informs all nodes (multicast) that it has completed rehashing. Joining cache node drains tx log and disables tx logging. Remote writes go straight to the underlying data container from now on.

At 320, joining cache node informs the coordinator that the join process is complete, thus allowing other joiners to start.

Figure 4:
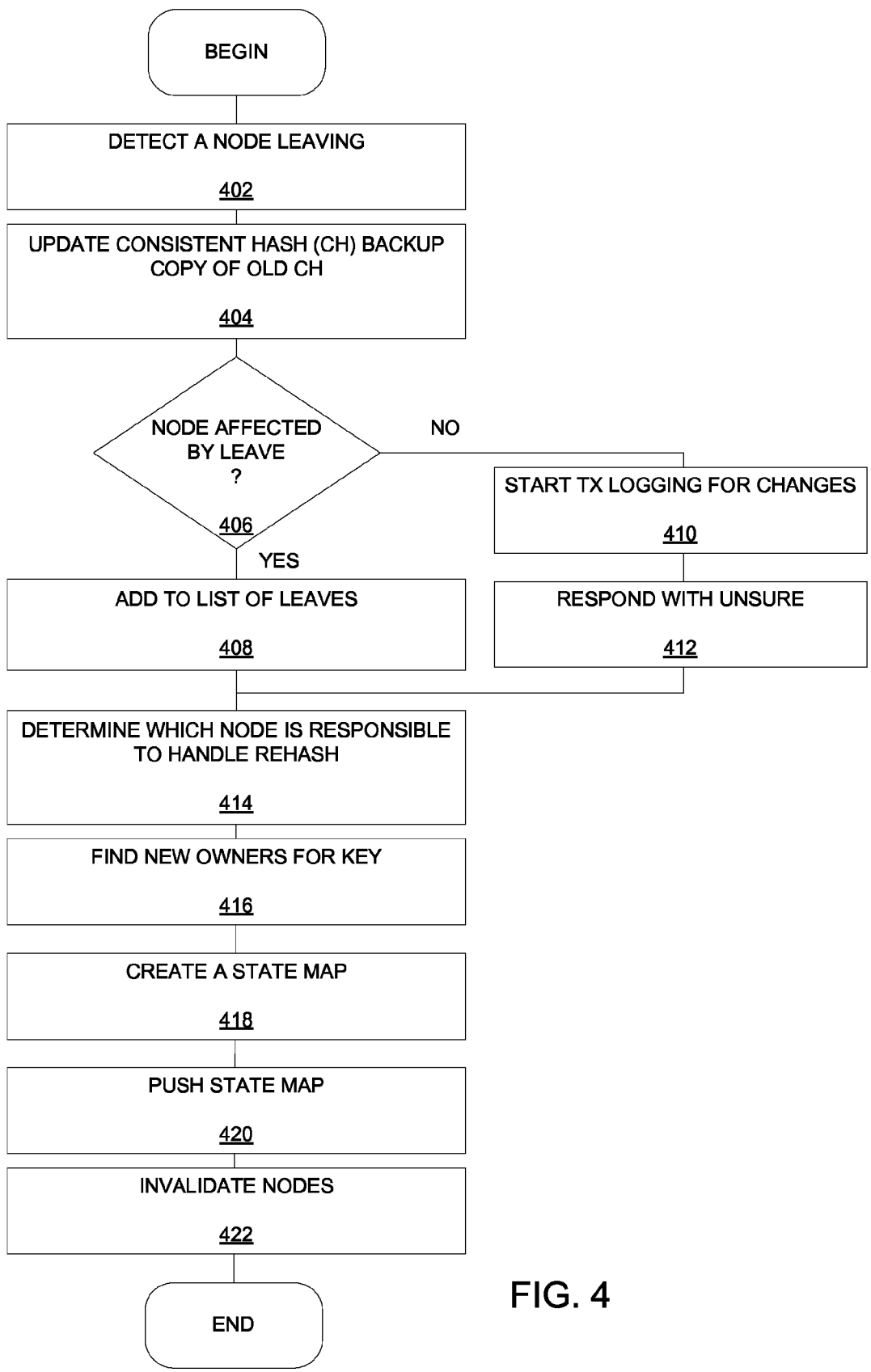
FIG. 4 is a flow diagram illustrating one embodiment of a method for non-blocking rehashing of a node leaving a cache cluster.

FIG. 4 is a flow diagram illustrating one embodiment of a method for non-blocking rehashing of a node leaving a cache cluster. Each node maintains a concurrent list of leavers (LL). At 402, when a leave is detected, CH (and any UnionCH) is updated to remove the leaving cache node. A copy of the old version of the CH is made.

At 406, determine if a cache node is affected by the leave. This is calculated by locating the position of the leaving cache node (L), and if L is adjacent (+ or −1 in position) then:
  L is added to LL at 408.
  If an existing LeaveTask is in progress, it is canceled.
  Start a LeaveTask include:
  If the node is in L+ or −replCount, then start tx logging for changes at 410, and respond to read requests with an UnsureResponse at 412.
  At Looping thru all state and see if it included anyone in LL. If so, determine whether it is the current node's responsibility to handle the rehash for this entry at 414.
  For each L in LL:
  if L is last in the list of CH-determined locations and current is last−1 OR
  if L is NOT last in the list of CH-determined locations and current is L+1
  At 416, find new owners for key by creating (or adding to) a state map for all new owners that were not old owners as well. At 418, state maps are pushed to respective recipients.

This happens in parallel. Each node that receives state then drains its txLog and switches off tx logging.

At 422, nodes that no longer own keys pushed are invalidated.

Figure 5:
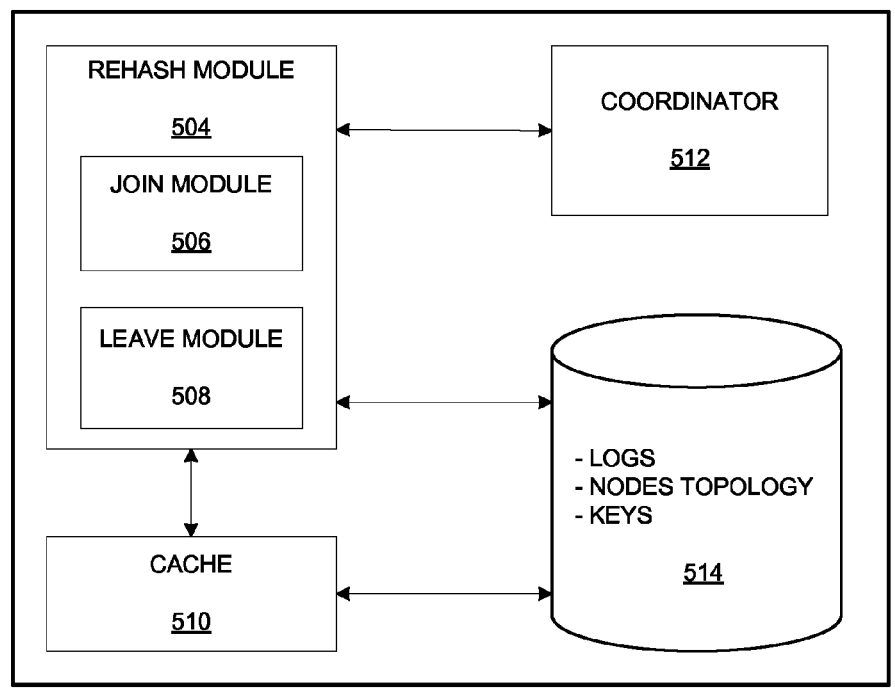
FIG. 5 is a block diagram illustrating an example of a computer system including non-blocking rehashing.

FIG. 5 is a block diagram illustrating an example of a computer system 500 including non-blocking rehashing. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device, a cache cluster 510, a storage device 514, and a coordinator 512.

The processing device includes rehashing module 504 that includes a join module 506, and a leave module 508. Storage device 514 can store logs, node topology, and hashed keys. Processing device represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. The processing device is configured to execute modules 506 and 508 for performing the operations and steps discussed herein with. In one embodiment, the modules may be include hardware or software or a combination of both.

The computer system 500 may further include a network interface device. While the computer-accessible storage medium 530 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving a request to change a topology of a cache cluster from a first group of cache nodes to a second group of cache nodes at a coordinator of a computer system, the request including a cache node joining or leaving the first group; and rehashing a key for the second group without blocking access to the first group while rehashing.

2. The computer-implemented method of claim 1 wherein the coordinator is configured to send a joining cache node the topology of the cache cluster before the joining cache node joins the cache cluster.

3. The computer-implemented method of claim 2 further comprising:

enabling transaction logging to log incoming writes; and
multicasting to the first group to inform of a rehash in progress.

4. The computer-implemented method of claim 3 further comprising:

updating consistent hashes of all cache nodes to union consistent hashes;
selecting cache nodes that can send their state to the joining cache node;
sending a state pull request to the selected cache nodes, the selected cache nodes looping through all keys in their corresponding data containers and identifying keys to be sent to the joining cache node by consulting their consistent hashes;
receiving keys from the selected cache nodes; and
multicasting to the first group and the coordinator to inform the fist group and the coordinator that the rehash is completed.

5. The computer-implemented method of claim 1 further comprising:

detecting a leave request from a leaving cache node;
concurrently maintaining a list of leaving cache nodes at each cache node; and
updating a consistent hash to remove the leaving cache node from the topology of the cache cluster.

6. The computer-implemented method of claim 5 wherein updating the consistent hash comprises:

temporarily storing a copy of an old version of a consistent hash key; and
determining if a cache node in the first group is affected by the leaving cache node.

7. The computer-implemented method of claim 6 further comprising:

looping through all states to determine whether a state includes a cache node from the list of leaving cache nodes;
determining whether it is a current node's responsibility to rehash for an entry; and
pushing a state map to the affected cache nodes.

8. A non-transitory computer-readable storage medium, having instructions stored therein, which when executed, cause a computer system to perform a method comprising:

receiving a request to change a topology of a cache cluster from a first group of cache nodes to a second group of cache nodes at a coordinator of a computer system, the request including a cache node joining or leaving the first group; and
rehashing a key for the second group without blocking access to the first group while rehashing.

9. The non-transitory computer-readable storage medium of claim 8 wherein the coordinator is configured to send a joining cache node the topology of the cache cluster before the joining cache node joins the cache cluster.

10. The non-transitory computer-readable storage medium of claim 9 wherein the method further comprises:

enabling transaction logging to log incoming writes; and
multicasting to the first group to inform of a rehash in progress.

11. The non-transitory computer-readable storage medium of claim 10 wherein the method further comprises:

updating consistent hashes of all cache nodes to union consistent hashes;
selecting caches nodes that can send their state to the joining cache node;
sending a state pull request to the selected cache nodes and the selected cache nodes looping through all keys in their corresponding data containers and identifying keys to be sent to the joining cache node by consulting their consistent hashes;
receiving keys from the selected cache nodes; and
multicasting to the first group and the coordinator to inform the first group and the coordinator that the rehash is completed.

12. The non-transitory computer-readable storage medium of claim 8 wherein the method further comprises:

detecting a leave request from a leaving cache node;
concurrently maintaining a list of leaving cache nodes at each cache node; and
updating a consistent hash to remove the leaving cache node from the topology of the cache cluster.

13. The non-transitory computer-readable storage medium of claim 12 wherein updating the consistent hash comprises:

temporarily storing a copy of an old version of a consistent hash key; and
determining if a cache node in the first group is affected by the leaving cache node.

14. The non-transitory computer-readable storage medium of claim 13 wherein the method further comprises:

looping through all states to determine whether a state includes a cache node from the list of leaving cache nodes;
determining whether it is a current node's responsibility to rehash for an entry; and
pushing a state map to the affected cache nodes.

15. A computer system comprising:

a memory comprising a network of cache nodes;
a processor coupled to the memory, the processor configured to operate on data from the network of cache nodes, the processor comprising a rehash module and a coordinator module, the rehash module comprising a join module and a leave module; and
a storage device coupled to the processor, the storage device configured to store a topology of the cache nodes with corresponding keys.

16. The computer system of claim 15 wherein the coordinator is configured to send a joining cache node the topology of the cache cluster before the joining cache node joins the cache cluster.

17. The computer system of claim 16 wherein the join module is configured to enable transaction logging to log incoming writes, and multicast to the first group to inform of a rehash in progress.

18. The computer system of claim 17 wherein the join module is configured to update consistent hashes of all cache nodes to union consistent hashes, to select caches nodes that can send their state to the joining cache node, to send a state pull request to the selected cache nodes, the selected cache nodes looping through all keys in their corresponding data containers to identify keys to be sent to the joining cache node by consulting their consistent hashes, to receive keys from the selected cache nodes, and to multicast to the first group and the coordinator to inform the first group and the coordinator that the rehash is completed.

19. The computer system of claim 15 wherein the leave module is configured to detect a leave request from a leaving cache node, to concurrently maintain a list of leaving cache nodes at each cache node, and to update a consistent hash to remove the leaving cache node from the topology of the cache cluster.

20. The computer system of 19 wherein the leave module is configured to temporarily store a copy of an old version of a consistent hash key, to determine if a cache node in the first group is affected by the leaving cache node, to loop through all states to determine whether a state includes a cache node from the list of leaving cache nodes, to determine whether it is a current node's responsibility to rehash for an entry, and to push a state map to the affected cache nodes.

* * * * *